United States Patent [19]

Kerr et al.

[11] 4,324,849

[45] Apr. 13, 1982

[54] IMAGEWISE ACCELERATING EQUILIBRATION IN ULTRASONOGRAPHIC RECORDING

[75] Inventors: Donald L. Kerr, Rochester; Gary M. Russo, Churchville, both of N.Y.

[73] Assignee: Eastman Kodak Company, Rochester, N.Y.

[21] Appl. No.: 161,521

[22] Filed: Jun. 20, 1980

Related U.S. Application Data

[63] Continuation-in-part of Ser. No. 56,499, Jul. 11, 1979, abandoned.

[51] Int. Cl.³ .................. G03C 5/26; G01N 29/00
[52] U.S. Cl. ........................................ 430/3; 73/606; 128/660
[58] Field of Search ................ 430/3; 73/603–608; 128/660

[56] References Cited

U.S. PATENT DOCUMENTS 2,627,600  2/1953  Rines ........................................ 430/3

FOREIGN PATENT DOCUMENTS 1095129  5/1955  France .................................... 430/3
7806450  5/1979  Netherlands ........................... 430/3

OTHER PUBLICATIONS

Chem. Absts., vol. 79, 1973, p. 370, 37041w.
Journal of the Acoustical Society, vol. 25, No. 6, Nov. 1953, pp. 1149–1151, Bennett, "On the Mechanism of the Photographic Effect of Ultrasonic Waves".
Berger, "Photograhic Film Detection Methods for Ultrasonic Field Visualization", J. Acoust. Soc. Am. 34(4), pp. 518–519 (1962).
Gangoli, "Effect of Ultrasonics on Photographic Films", Journal of the Physical Society of Japan, vol. 25, No. 5, Nov. 1968, pp. 1500–1506.
Ernst, "Ultrasonography", Journal of Acous. Soc. Am., vol. 22, No. 1, pp. 80–83, Jan. 1951.

*Primary Examiner*—Mary F. Downey
*Attorney, Agent, or Firm*—Carl O. Thomas

[57] ABSTRACT

A process is disclosed for recording an ultrasonic exposure pattern employing an ultrasonographic element containing a support and a recording layer unit. The recording layer unit is placed into contact with a transport liquid and imagewise ultrasonically exposed to accelerate imagewise diffusion from the recording layer unit to the transport liquid, thereby producing in the recording layer unit an ultrasonographic record. Diffusion is further accelerated imagewise by establishing a temperature differential within the transport liquid adjacent the recording layer unit.

19 Claims, No Drawings

IMAGEWISE ACCELERATING EQUILIBRATION IN ULTRASONOGRAPHIC RECORDING

CROSS-REFERENCE TO RELATED APPLICATION(S)

This is a continuation-in-part of Ser. No. 056,499, filed July 11, 1979, now abandoned.

FIELD OF THE INVENTION

This invention relates to an improvement in ultrasonography. More specifically this invention relates to an improvement in obtaining an ultrasonographic record by imagewise accelerating diffusion from an ultrasonographic element to a transport liquid.

BACKGROUND OF THE INVENTION

The terms "ultrasonic radiation" and "ultrasound" are employed interchangeably in this specification to designate pressure-rarefaction waves differing from sound waves in exhibiting higher frequencies and shorter wavelengths. The term "ultrasonic exposure" is employed to designate exposure to ultrasonic radiation. The production of visible images by means of ultrasonic radiation is referred to in the art as "ultrasonoscopy". The production by means of ultrasonic radiation of a record which is in, or can be converted to, a viewable form is referred to as "ultrasonography". The instruments for producing ultrasonoscopic images are designated "ultrasonoscopes", and the ultrasonoscopes which produce ultrasonographic images are referred to as "sonographic cameras". Elements which form records of ultrasonic radiation patterns as a result of being ultrasonically exposed in a sonographic camera are referred to as "ultrasonographic elements". Instruments which are capable of permitting ultrasonographic elements to be concurrently exposed in different areas to different intensities of ultrasound are referred to as "sonographic sensitometers".

The definition of terms as here presented is believed to be generally consistent with the use of these terms in the art. Specifically, most of these terms are suggested by P. J. Ernst in the *Journal of the Accoustical Society of America*, Vol. 22, No. 1, in an article entitled "Ultrasonography", pp. 80–83, January 1951.

In Belgian Pat. No. 864,089, dated Aug. 17, 1978 (generally corresponding to U.S. Pat. No. 4,223,082), there is disclosed a process for imagewise ultrasonically exposing an ultrasonographic element while in contact with a transport liquid to produce an ultrasonographic record which can be converted to a viewable ultrasonographic image. Specifically, it is disclosed to employ as an ultrasonographic element a silver halide photographic element comprised of a photographic support and a silver halide emulsion layer. The silver halide emulsion layer, which functions as an ultrasound recording layer unit, is placed into contact with a transport liquid, such as a polar solvent, preferably water or an aqueous solution. Following contact, diffusion between the emulsion layer and the transport liquid begins, tending to bring the emulsion layer and the transport liquid more closely into equilibrium. By imagewise ultrasonically exposing the emulsion layer, the rate of diffusion is accelerated in imagewise exposed areas. Since diffusion between the emulsion layer and the transport liquid has the effect of altering the electromagnetic radiation response of the emulsion layer, diffusion has the effect of producing in the emulsion layer a record of the image pattern of ultrasonic exposure (that is, an ultrasonographic record) which can be converted to a viewable ultrasonographic image by exposure to electromagnetic radiation, typically light, and subsequent photographic processing.

Although Belgian Pat. No. 864,089, cited above, employs silver halide photographic elements, ultrasonographic imaging processes are known which employ differing ultrasonographic elements as well as differing transport liquids in producing an ultrasonographic record.

In commonly assigned, copending patent application titled ULTRASOUND IMAGING OF INTERNALLY FOGGED SILVER HALIDE ELEMENTS, Ser. No. 3,571, filed Jan. 15, 1979, now U.S. Pat. No. 4,228,230 there are disclosed internally fogged silver halide emulsion layer containing elements useful as ultrasonographic elements. The process of ultrasonographic exposure differs from that of Belgian Pat. No. 864,089 in that no light exposure step is employed during or after ultrasound exposure in order to produce a viewable ultrasonographic image. A solute capable of revealing the internal fog in the emulsion layer is contained in the transport liquid.

In commonly assigned, copending patent application titled ULTRASONIC IMAGING WITH CATALYTIC ELEMENTS, Ser. No. 8,910, filed Feb. 2, 1979, now U.S. Pat. No. 4,225,658 ultrasonographic elements are disclosed containing a catalyst layer. Ultrasonic exposure can be undertaken while the ultrasonographic element is in contact with a transport liquid containing a catalyst poison. Light exposure is not requiring for imaging.

In commonly assigned, copending patent application titled ULTRASONOGRAPHIC ELEMENTS CONTAINING MULTIPLE LAYERS AND PROCESS FOR THEIR USE, Ser. No. 30,665, filed Apr. 16, 1979, now U.S. Pat. No. 4,269,914 there are disclosed ultrasonographic elements which contain in addition to a silver halide emulsion layer in the recording layer unit an additional layer, separated by a barrier layer, which can supplement the transport liquid in supplying or receiving diffusible ions in accelerating equilibration.

Although the above-cited disclosures differ in their specifics, each is directed to a process of recording an ultrasonic exposure pattern employing an ultrasonographic element comprised of a support and a recording layer unit. The recording layer unit is contacted with a transport liquid and imagewise ultrasonically exposed to accelerate imagewise diffusion between the recording layer unit and the transport liquid, thereby producing in the recording layer an ultrasonographic record. The ultrasonographic record can itself be viewable or can be converted to a viewable form by subsequent processing.

Ultrasonographic recording by the general process described above is limited by the maximum rate of diffusion which can be induced by ultrasonic exposure. Although increasing the ultrasonic exposure itself is a direct approach to increasing the rate of diffusion, for many imaging applications it is desirable or even necessary to operate at very low ultrasound exposure levels. For example, where an ultrasonographic image is being produced by exposing a living subject to ultrasound, it is desirable to maintain the lowest feasible level of ultrasonic exposure and guidelines have been established for maximum human exposures. Increasing the rate of spontaneous diffusion between the ultrasonographic element and the transport liquid in the absence of ultrasound can have the effect of permitting higher rates of equilibration to be obtained by ultrasonic exposure, but this approach is limited by disadvantages—e.g., background density levels can become objectionably large, loss of image discrimination can result and inconveniently short periods of contact between the ultrasonographic element and the transport liquid can be required.

SUMMARY OF THE INVENTION

In one aspect this invention is directed to a process of recording an ultrasonic exposure pattern employing an ultrasonographic element comprised of a support and a recording layer unit capable of producing an ultrasonographic record as a function of diffusion into a transport liquid, the recording layer unit being beneath the support and in contact with the transport liquid. This process comprises imagewise ultrasonically exposing the recording layer unit through the transport liquid to accelerate diffusion from the recording layer unit into the transport liquid in exposed areas, thereby producing in the recording layer unit an ultrasonographic record. The process is characterized by the improvement comprising further accelerating diffusion in ultrasonically exposed areas by establishing a temperature differential within the transport liquid adjacent the recording layer unit so that the transport liquid remote from the recording layer unit is at a relatively lower temperature than the transport liquid contacting the recording layer unit.

In terms of the ultrasonographic images which have been observed produced by this process, higher maximum densities in ultrasonically exposed areas are obtained. Additionally, significantly increased image discrimination (maximum density minus minimum density) has been observed. Still further, little or no elevation of minimum density levels in background areas has been observed.

DESCRIPTION OF PREFERRED EMBODIMENTS

While subheadings are provided for convenience, to appreciate fully the elements of this invention, it is intended that this disclosure be read and interpreted as a whole.

ULTRASONIC EXPOSURE

This invention is generally applicable to processes of producing an ultrasonographic record in which an ultrasonographic element is comprised of a recording layer unit coated on a support to form the sole or outermost layer unit of the element. Ultrasound is conducted through a transport liquid from an appropriate source to the element, and the element is oriented so that the recording layer unit is beneath the support and forms the interface at which ultrasonic radiation is transferred from the transport liquid to the element. In the areas of the element exposed to ultrasound, diffusion from the recording layer unit to the transport liquid is accelerated, thereby producing an ultrasonographic record in the recording layer unit. The recording layer unit consists of at least a single recording layer and, optionally, a combination of one or more recording layers and transport liquid permeable layers which alter the rate of diffusion from the recording layer unit.

It has been discovered that, in such processes, the rate of diffusion from the recording layer unit to the transport liquid in ultrasonographically exposed areas can be accelerated further without significantly affecting background or ultrasonically unexposed areas. This is achieved by establishing a temperature differential within the transport liquid adjacent the recording layer unit so that the transport liquid remote from the recording layer unit is at a relatively lower temperature than the transport liquid contacting the recording layer unit.

In this arrangement the direction of ultrasound propagation is upward through the transport liquid to the ultrasonographic element. Typically the ultrasonographic element is oriented substantially normal to the direction of ultrasound propagation. The temperature of the transport liquid in contact with the recording layer unit is maintained higher than the temperature of the transport liquid removed from contact with the recording layer unit. That is, a temperature differential is established within the transport liquid adjacent the recording layer unit so that the temperature progressively decreases in moving from the surface of the recording layer unit in contact with the transport liquid to a location within the transport liquid remote from the recording layer unit.

In the arrangement described above the temperature differential in the transport liquid adjacent the recording layer unit is such that the temperature increases in an upward direction as the ultrasonographic element is approached. Since it is known that the rate of propagation (i.e., transmission speed) of ultrasound in a liquid increases with the temperature of the liquid, it is apparent that the temperature differential has the effect of accelerating the ultrasonic radiation as it passes through the portion of the transport liquid adjacent the recording layer unit. The improvement which this produces in the ultrasonographic record has been described above in terms of observed improvements in ultrasonographic images. The mechanism of ultrasonographic record generation is local acceleration of the rate of diffusion from the recording layer unit to the transport liquid by image-wise exposure to ultrasound. The enhancement of the ultrasonographic record is a result of further locally accelerating this diffusion in ultrasonically exposed areas.

The demonstratable mechanisms of the ultrasonographic record generation described above do not account for or in any way predict the observed improvements in the ultrasonographic records obtained by establishing a temperature differential in the transport liquid adjacent the recording layer unit so that the temperature increases in an upward direction. While only empirically proven by the results obtained, it appears that the temperature differential functions to enhance ultrasound induced convection at the surface of the recording layer unit. In the absence of convective flow a concentration gradient is created at the boundary of the transport liquid and the recording layer unit by diffusion occurring across the boundary during equilibration. For example, a species diffusing out of the recording layer unit becomes more concentrated in the transport liquid at its boundary with the recording layer unit. The result is to create a diffusion impedance between the recording layer unit and the transport liquid. In the presence of convection flow the concentration gradient in the transport liquid at the recording layer unit boundary is disrupted, and the diffusion impedance across the boundary is reduced. In the absence of convection flow diffusion still occurs, but it is rate limited by the diffusion impedance at the boundary. It is believed that by maintaining a temperature differential in the transport liquid adjacent the recording layer unit to accelerate the ultrasound in its propagation upwardly the convection force which the ultrasonic radiation can exert on the transport liquid is significantly increased. The temperature differential does not directly induce a substantial increase in convection in the absence of ultrasound, since, being uniformly applied, the temperature differential would in such case accelerate diffusion in ultrasonically unexposed areas of the recording layer unit, which is at variance with the observed imaging response.

In addition to explaining the very significant improvements in ultrasonographic imaging obtained by this process it is believed that the inferiority of alternative arrangements can also be explained in terms of convection flow. Ultrasonographic elements which function by equilibration between a recording layer unit and a transport liquid include both those in which diffusion occurs from the recording layer unit to the transport liquid and those in which diffusion occurs from the transport liquid to the recording layer unit. In the latter case, the species diffusing into the recording layer unit becomes relatively depleted in the transport liquid at its boundary with the recording layer unit. It is believed that the reduction in concentration adjacent the recording layer unit has the effect of reducing the rate of propagation of ultrasound and reduces the convective force which the ultrasound excerts on the transport liquid. It is believed that the significant advantages of the present invention are obtained as a result of both concentration and temperature gradients working to accelerate ultrasound and increase the convection force it can exert on the transport liquid. In the practice of the present invention arrangements are avoided which result in concentration depletion occuring at the boundary of the recording layer unit and the transport liquid. Arrangements in which diffusion occurs from the recording layer unit to the transport liquid or concurrently in both directions are contemplated. Any known diffusible species or substance capable of producing an ultrasonographic record as a function of its imagewise distribution in the recording layer unit can be employed in the practice of this process. In addition, it is specifically contemplated to load the recording layer unit with substantially inert diffusible species, such as soluble salts (e.g., alkalie nitrates, or sulfates), to provide higher concentration gradients favoring an increase in the convection force.

Convection flow effects also explain the orientation of the ultrasonographic element during ultrasonic exposure. By positioning the element with the recording layer unit beneath the support and transmitting ultrasound upwardly to the element through the transport liquid, the proper temperature gradient according to this process is for the transport liquid to become progressively warmer in an upward direction approaching the recording layer unit. By having the warmer, less dense transport liquid above the cooler, more dense transport liquid, spontaneous convection apart from that induced by ultrasound is avoided. In the converse relationship, in which the cooler transport liquid overlies warmer transport liquid, spontaneous convection currents are favored, resulting in reduced image discrimination. The ultrasonic exposure orientation of having the recording layer unit beneath the support during ultrasonic exposure has been observed to produce a superior imaging result.

The temperature differential in the transport liquid adjacent the recording layer unit can be obtained in any convenient manner. The ultrasonographic element is oriented with the recording layer unit on its surface nearer the exposing ultrasonic radiation source, and the transport liquid remote from the recording layer unit is at a lower temperature than that in contact with the recording layer unit. This can be achieved by heating the ultrasonographic element to a temperature above that of the transport liquid so that upon contact thermal conduction from the ultrasonographic element to the transport liquid establishes the desired thermal gradient. Alternatively, the ultrasonographic element can be maintained at ambient temperature and the transport liquid cooled. Also, the transport liquid can be cooled to a temperature below ambient temperature and the ultrasonographic element heated to a temperature above ambient temperature.

From the foregoing it is apparent that the enhancement in the ultrasonographic record produced by this invention is a function of a thermal gradient rather than any specific choice of ultrasonic exposure temperatures. It is contemplated that the ultrasonographic elements employed in the practice of this process can be ultrasonically exposed at any temperature at which they are capable of providing an ultrasonographic record in the absence of an applied temperature differential.

The ultrasonographic record has been observed to be enhanced in direct relation to the temperature differential established in the transport liquid adjacent the recording layer unit. It is believed that only the temperature differential within the transport liquid in contact with and very near the recording layer unit contributes to the enhancement in results obtained. A practical approach to establishing and controlling the thermal gradient in the boundary region is to measure the temperature of the ultrasonographic element surface remote from the recording layer unit and the bulk temperature of the transport liquid at a point sufficiently removed from the ultrasonographic element to be substantially unaffected by the temperature of the ultrasonographic element. Their significance in terms of the boundary region thermal gradient is dependent upon the thermal conduction characteristics of both the particular transport liquid and ultrasonographic element employed.

Where the transport liquid is distilled water or an aqueous solution and the ultrasonographic element is comprised of a recording layer unit coated on a polymeric film support, it is preferred that the ultrasonographic element and the transport liquid be within the temperature range of from about 5° to 80° C., more preferably in the range of from about 10° to 60° C., during ultrasonic exposure. The temperature differential, measured as described above, is preferably in the range of from about 1° to 75° C., most preferably from 5° to 50° C. It is specifically contemplated to maintain one of the transport liquid and the ultrasonographic element at ambient temperature prior to contact with the other, although this is by no means essential.

In perhaps the simplest arrangement for ultrasonic exposure an ultrasonic trandsucer is positioned in a transport liquid containing reservoir, and the ultrasonographic element is immersed in the reservoir with its recording layer unit in contact with the transport liquid and spaced from the ultrasonic transducer to receive ultrasonic radiation. To facilitate convection in the boundary region with the recording layer unit the transport liquid is preferably of a viscosity not appreciably higher than about 1.5 centipoise. Generally the transport liquid is at a viscosity in the range of from about 0.5 to 1.5 centipoise. It is preferred that the ultrasonographic element be positioned substantially horizontally during ultrasonic exposure. The recording layer unit forms the lower surface of the element during ultrasonic exposure.

Instead of employing a single transport liquid, one transport liquid can be in contact with the transducer, and a second transport liquid can be in contact with the recording layer unit. The two liquids can be in direct contact or separated by an ultrasonically conducting member, such as a membrane. Since the second transport liquid is not in contact with the ultrasonographic element and does not participate in equilibration with the element, it is apparent that any transport liquid can be employed which is capable of conducting ultrasound. In fact, a gaseous transport medium can be substituted for the second transport liquid where the ultrasound attenuation is not objectionable. The first transport liquid can actually be contained within and, along with the membrane, form a part of the ultrasonographic element, if desired.

In choosing among otherwise comparable transport liquids, whether they directly contact the recording layer unit to be exposed or are remote or external, consideration can be given to the ultrasonic absorption coefficient of the transport liquid. Water at an ultrasonic frequency of 5 megahertz and at a temperature of 20° C. has an ultrasonic absorption attenuation coefficient of $6 \times 10^{-3}$ cm$^{-1}$. The ultrasonic absorption attenuation coefficients for liquids range from about two orders of magnitude higher than that of water to about two orders of magnitude lower than that of water. The advantage to be achieved by a low ultrasonic absorption coefficient is reduced dissipation of ultrasonic energy in the transport liquid. Lower ultrasonic attenuation coefficients are particularly preferred for the transport liquids external to the ultrasonographic element or remote from the recording layer unit. It is believed that higher ultrasonic absorption coefficients for transport liquids which contact the recording layer unit can contribute to improving their response to ultrasound.

Ultrasonic absorption coefficients of transport liquids can be ascertained by reference to published values. For example, values are published by Kinsler and Frey, *Fundamentals of Acoustics*, Wiley, N.Y., 1950; Hueter and Bolt, *Sonics*, Wiley, N.Y., 1955; and Herzfeld and Litovitz, *Absorption and Dispersion of Ultrasound Waves*, Academic Press, N.Y., 1959.

Ultrasonic exposure of the recording layer unit of the ultrasonographic element while in contact with the transport liquid and while a temperature differential is established in the transport liquid as described above can be undertaken by techniques otherwise identical to those known in the art. For example, the teachings of Belgian Pat. No. 864,089, cited above, are considered sufficiently detailed to enable a person skilled in the art to practice this process step. Nevertheless, the ultrasonic exposure step of this process is summarized below.

The ultrasonographic element can be imagewise exposed to ultrasonic radiation using any conventional sonographic camera which is capable of impinging ultrasonic radiation on a ultrasonographic element as an image receptor. In such a sonographic camera an ultrasound source or transducer (i.e., an emitter of ultrasonic radiation) and the ultrasonographic element are spatially related so that the ultrasonic radiation, unless absorbed, can impinge on the recording layer unit to be imagewise exposed. Between the ultrasound transducer and the ultrasonographic element is interposed any means which will imagewise modulate the ultrasonic radiation as it is received by the recording layer unit. In a simple form this can take the form of an apertured template which absorbs or reflects the ultrasonic radiation which strikes it and allows a portion of the ultrasonic radiation to pass through the aperture to the ultrasonographic element. Alternatively the reflected ultrasonic radiation can be caused to impinge on the ultrasonographic element. In a more sophisticated form the imaging means can include combinations of sonic lenses and reflectors for focusing and directing the ultrasonic radiation. In one application of this process an object whose ultrasonic modulation characteristic is desired to be recorded is placed in the sonographic camera so that it intercepts ultrasonic radiation passing from the ultrasound transducer to the ultrasonographic element. For example, the ultrasonoscope of Brenden U.S. Pat. No. 3,765,403 can be readily adapted for use as a sonographic camera in the practice of this invention merely by locating the ultrasonographic element in one of the water tanks so that it is impinged by the ultrasonic radiation which has passed through or been reflected by the object under examination. A preferred ultrasonographic exposure apparatus is disclosed in commonly assigned, copending patent application titled ULTRASONOGRAPHIC EXPOSURE APPARATUS, Ser. No. 30,972, filed Apr. 18, 1979, now U.S. Pat. No. 4,232,555 the disclosure of which is here incorporated by reference.

Except where rapid diffusion from the ultrasonographic element as a function of contact with the transport liquid prohibits, it is usually preferred to allow the ultrasonographic element at least a few seconds, preferably at least about 10 seconds, of contact with the transport liquid before initiating ultrasonic exposure. Delaying ultrasonic exposure after initial contact with the transport liquid can be used to enhance the ultrasonographic response. The optimum delay period for a particular element can be correlated to the transport liquid contact period at which incipient alteration of the recording characteristics of the element is observed. For some elements observable alteration begins immediately upon contact with the transport liquid, and there is no advantage to delaying the ultrasonic exposure.

Imagewise exposure of the ultrasonographic element in the sonographic camera is at an intensity and for a duration which is known in the art to be sufficient to accelerate imagewise diffusion to the transport liquid from the recording layer unit. Although both high and low levels of ultrasound exposure are possible, it is generally preferred to employ low levels of ultrasound exposure, particularly where living subjects are being exposed. Successful imaging is readily achieved with preferred ultrasonographic elements, such as those in Belgian Patent No. 864,089 and patent application Ser. No. 30,665 (U.S. Pat. No. 4,269,914), cited above, at ultrasonic exposures below 100 watt-sec/cm$^2$ by this process.

Different ultrasonographic elements exhibit different threshold sensitivities to ultrasonic radiation. By exposing ultrasonographic elements to differing ultrasonic intensities and then converting the ultrasonographic record to a viewable form, the optimum ultrasonic exposure for a given ultrasonographic element can be readily determined. In a manner analogous to photographic sensitometry using a step tablet, it is possible to expose an ultrasonographic element simultaneously in lateral areas with an array of laterally spaced ultrasound transducers which are calibrated to transmit ultrasonic radiation at predetermined stepped levels of intensity. Densities produced directly or following processing by each ultrasound transducer can be plotted against ultrasonic exposure. This generates an ultrasonic characteristic curve for the particular ultrasonographic element from which the optimum intensity of ultrasonic exposure can be readily determined.

The determination can be repeated using differing durations of ultrasonic exposure, if desired, although this is not usually necessary. In using photographic cameras varied shutter speeds (exposure times) and f-stop settings (exposure intensities) are available to the photographer to achieve a given exposure, since exposure is recognized to be the mathematical product of exposure time and intensity. The proposition that equal photographic exposures differing in intensity and duration produce similar photochemical response is referred to as the photographic reciprocity law, and this law is generally relied upon in photography in varying exposure times and intensities, although it is recognized that many photographic elements exhibit significant reciprocity law failure. By analogy to photography, various combinations of ultrasonic exposures as a mathematical product can be relied upon in a general way in accordance with a reciprocity law of ultrasonic exposure which is analogous to the photographic reciprocity law.

A significant ultrasonic exposure reciprocity law departure discussed in Belgian Patent No. 846,069 can be put to favorable use. At equal exposures differing in intensity and duration the ultrasonographic speeds observed progressively increase as a function of the shortening of the exposure duration. Viewed another way, by using shorter durations of ultrasonic exposure, less than expected increases in intensity are required to achieve a particular ultrasonographic speed. This is particularly advantageous, since many objects which might be ultrasonographically examined are limited in both the intensity and duration of the ultrasonic radiation which they can withstand safely without risk of degradation. Generally the longer the duration of exposure above a threshold minimum level of intensity the lower the intensity must be to avoid degradation. The favorable ultrasonic exposure reciprocity law departure allows the use of lower than the expected intensities with decreased duration of exposure, thereby avoiding degradation without sacrificing ultrasonographic speed.

Any ultrasonic frequency heretofore employed in ultrasonography can be applied to the practice of this process. For a given transmission medium the wavelength of the ultrasonic radiation is reciprocally related to its frequency. Since best imaging results in ultrasonography and ultrasonoscopy are recognized to be obtainable when the wavelength of the ultrasonic imaging radiation is substantially shorter than the dimension of the object or object feature to be imaged, it is generally preferred to operate at shorter wavelengths and hence higher frequencies. For example, at a frequency of 1 megahertz ultrasonic radiation transmitted in water exhibits a wavelength in the order of 1.5 millimeters. Accordingly in obtaining ultrasonographs of objects or object features of about 1.5 millimeters in dimension it is preferred to operate substantially above 1 megahertz, typically in the range of 2.5 to 100 megahertz. Frequencies in the order of gigahertz are known in the art and can be employed, particularly when microscopic image definition is required. The high operating frequencies are, of course, advantageous since they effectively define both large and small objects and object features, although increased absorptivity of many materials at higher frequencies requires thinner object samples.

The ultrasonic exposure of the ultrasonographic element can be constant in intensity for the duration of exposure or it can be varied in intensity. An increase in response for a given ultrasonographic element can be achieved if the ultrasonic exposure is pulsed. Pulsing of the ultrasonic exposure can be achieved by continuously modulating the intensity of exposure or, preferably, interrupting ultrasonic exposure so that ultrasonic exposure is divided into separate bursts or discrete pulses. It is preferred to employ discrete pulses wherein the duration of the pulses and the interval therebetween is less than a tenth of a second. The response of the ultrasonographic element can be increased further by employing higher frequencies of pulsing. The duration of the ultrasonic pulse and the interval between pulses can be varied independently, if desired.

Upon completion of the ultrasonic exposure an ultrasonographic record is present in the recording layer unit of the ultrasonographic element. The ultrasonographic record can itself be viewable or subsequent processing can be employed to produce a viewable image, either in the ultrasonographic element or in a separate element, such as a receiver. The processing steps, if any, following ultrasonographic recording according to this invention can be conducted by procedures well known in the art. Such procedures are, of course, chosen for the particular ultrasonographic element and transport liquid composition employed.

In perhaps the simplest approach to producing an ultrasonographic image according to this invention the ultrasonographic record can itself be viewable as formed. For example, in a simple form the recording layer unit can be a liquid permeable layer, such as a hydrophilic colloid layer, the transport liquid can be water or an aqueous solution and the recording layer unit can initially contain a diffusible dye. A variety of diffusible dyes suitable for this purpose are known in photography, such as azo, azomethine, azopyrazolone, indoaniline, indophenol, anthraquinone, triarylmethane, alizarin, merocyanine, nitro, quinoline, cyanine, indigo, and phthalocyanine dyes. Following contact between the transport liquid and the recording layer unit ultrasound accelerated diffusion according to this invention as described above produces an imagewise distribution of dye in the recording layer unit which at once forms both an ultrasonographic record and a viewable image. The dye density is perceptibly reduced in the ultrasonically exposed areas of the recording layer unit.

To minimize diffusion in background areas which can tend to reduce image discrimination the ultrasonographic element is removed from contact with the transport liquid following ultrasonic exposure. In some instances an enhancement in the ultrasonographic record is obtained if the ultrasonographic element is allowed to remain undisturbed for a few seconds following ultrasound exposure. As described below, silver halide photographic elements are allowed to remain undisturbed in contact with the transport liquid until after light exposure.

Ultrasonographic Imaging with Silver Halide Photographic Elements

In a specifically preferred form of the invention the ultrasonographic elements employed are silver halide photographic elements. Processes for producing ultrasonographic images employing such elements are disclosed in Belgian Patent No. 864,089, the disclosure of which is here incorporated by reference. Upon formation of an ultrasonographic record in one or more of the silver halide emulsion layers of the photographic elements the next step of the process is to convert the ultrasonographic record into a photographic latent image. This is done by nonimagewise exposing the photographic element to electromagnetic radiation, typically light. Thereafter the latent image can be converted into a viewable image by conventional photographic processing.

In a specifically preferred form of this process the photographic silver halide element to be imagewise exposed contains a silver halide emulsion recording layer unit in contact with a polar solvent acting as a transport liquid. The function of the polar solvent is to provide a medium in which ionic diffusion can occur.

Any conventional technique for contacting the polar solvent with the recording layer unit can, of course, be employed. The photographic element can be immersed in a polar solvent reservoir, or the photographic element can be sprayed, swabbed, bathed or otherwise analogously contacted with the polar solvent.

Water is a preferred polar solvent for use in the practice of this process; however, any polar solvent or combination of polar solvents known to be compatible with the photographic elements to be exposed can be employed. Exemplary useful polar solvents in addition to water include water-miscible alcohols, ketones and amides (e.g., acetone, phenol, ethyl alcohol, methyl alcohol, isopropyl alcohol, ethylene glycol, N,N-dimethylformamide, N-methylacetamide, N,N-dimethylacetamide, methyl ethyl ketone), tetrahydrofuran, N-methyl-2-pyrrolidone, dimethylsulfoxide and mixtures of the above, with or without water. Any polar solvent which is compatible with the photographic element and which is sufficiently polar to permit ions, particularly halide ions, silver ions and/or hydrogen ions, to be diffusible therein can be employed in combination with silver halide photographic elements.

While polar solvents are preferred transport liquids for contact with silver halide emulsion recording layer units, particularly those containing a hydrophilic vehicle, such as hydrophilic colloid (e.g., gelatin or a gelatin derivative), it is recognized that other transport liquids capable of providing a diffusion medium can also be employed. The transport liquid which contacts the silver halide emulsion recording layer unit of the photographic element can be any chemically compatible liquid which provides a diffusion path to or from the silver halide grain surfaces for a species capable of altering their electromagnetic exposure response.

Electromagnetic exposure of the photographic element is undertaken as well as ultrasonic exposure. It is preferred to employ visible light during electromagnetic radiation exposure, and the description of electromagnetic radiation exposure is discussed in terms of light exposure. However, it is to be appreciated that the utility of this process is not limited to use with any particular portion of the electromagnetic spectrum, but can employ electromagnetic radiation of any wavelength heretofore known to be useful in photography, including ultraviolet and visible light, as well as infrared radiation, unless otherwise specifically qualified below.

In using an ultrasonographically negative-working photographic element (that is, one which is initially relatively insensitive to light exposure and which becomes more responsive as a result of ultrasonic exposure) it is only necessary that the light exposure strike those areas of the photographic element that are ultrasonically exposed. In other words, a light image which is a duplicate or approximation of the imagewise ultrasonic exposure can be employed. It is usually more convenient to expose in a nonimagewise manner, preferably uniformly, the photographic element to light so that registration of the two exposures is not required. For ultrasonographically negative-working elements light exposure can usefully occur at any stage following the onset of ultrasonic modification of the photographic element—i.e., either during or after ultrasonic exposure. Since the ultrasonographically negative-working photographic elements are initially relatively light-insensitive, light exposure of the photographic element before ultrasonic exposure can be permitted, but it is not responsible for latent image formation.

In using an ultrasonographically positive-working photographic element (that is, one which is initially sensitive to light exposure and becomes less responsive as a result of ultrasonic exposure), light exposure is required in those areas which are not initially imagewise ultrasonically exposed, and, as a practical matter, nonimagewise light exposure, usually uniform light exposure, is generally most convenient. It is generally preferred to avoid light exposure before or during ultrasonic exposure and to defer light exposure until after ultrasonic imagewise desensitization of the photographic element has been accomplished. Light exposure while ultrasonic exposure is still occurring is specifically contemplated, although not preferred. Further, prior to ultrasound exposure, the silver halide photograhic element can be given a nonimagewise, preferably uniform, light exposure of any type which does not destroy its photograhic imaging capability. For example, it is known in photography that a uniform light pre-exposure of a photographic element can have the effect of reversing the photographic image obtained following subsequent imagewise exposure and processing. This effect is commonly referred to as solarization and is further discussed below.

When ultrasonic and light exposures are concurrently undertaken, or at least undertaken in overlapping time periods, it is necessary to light expose the photographic element while it is still in contact with the transport liquid. For example, if the photographic element is immersed in a polar solvent or other transport liquid medium during ultrasonic exposure, light exposure can also be undertaken through this medium. Conveniently the ultrasonic transport liquids are most commonly substantially transparent (specularly transmissive to light over at least a portion of the visible spectrum). Where ultrasonic and light exposures are undertaken consecutively, it is possible to remove the photographic element from the environment of ultrasonic exposure—e.g., contact with the transport liquid—before light exposure is undertaken. However, it is preferred to light expose the photographic element after ultrasonic exposure without moving the element with respect to the transport liquid contacting the silver halide emulsion recording layer unit, and thus risking degradation of image definition.

According to a preferred technique for practicing this process, ultrasonic and light exposures are consecutive, rather than concurrent or overlapping. A significant increase in the imaging sensitivity of the ultrasonographic element occurs if light exposure follows ultrasonic exposure. Specifically, significant enhancement in density differences between ultrasonically exposed and background areas are observed when light exposure is delayed from about 10 to 200 seconds (optimally from about 15 to 50 seconds) following ultrasonic exposure at ordinary room temperatures (20° to 25° C.). This enhancement of the ultrasonographic image is attributed to a furtherance during the delay period of the alterations of the photograhic element initiated by ultrasonic exposure. It is preferred not to disturb the photographic element between ultrasonic and light exposure.

For ultrasonographically positive-working photographic elements conventional speed ratings for the photographic elements can be employed as an approximate guide for light exposure. To more precisely determine the exposure properties of an ultrasonographically positive-working photographic element a series of exposures, with different samples or using a step tablet, can be made under the conditions of actual use to identify optimum levels of electromagnetic radiation exposure. For example, the minimum level of light which produces a maximum density as well as the maximum level of light which produces a minimum density can be determined as well as exposures which produce intermediate density levels under the contemplated conditions of photographic processing. It is preferred to employ a light exposure in excess of that required to produce a maximum density in subsequent processing. However, low levels of light exposure which produce a density at least 0.1 above the minimum density (preferably 0.5 above minimum density) can be employed.

For ultrasonographically negative-working photographic elements, optimum levels of light exposure cannot be determined from the normal photographic speed ratings of the elements, since they are typically initially relatively insensitive to light. The optimum exposure for such negative-working photographic elements can be ascertained by contacting the photographic element with the transport liquid to be placed in contact with it during ultrasonic and light exposure and then variably light exposing the element, using different samples or a step tablet, after the ultrasonographically negative-working photographic element has approached its maximum light sensitivity.

In determining the optimum levels of light exposure as described above, the photographic elements are photographically processed in accordance with the techniques to be employed in this process. Once usable light exposure levels have been identified, intensity and duration of light exposure can be varied in accordance with the photographic reciprocity law.

It is recognized in photography that the integrated sum of intermittent light exposures can produce a higher density than a corresponding continuous light exposure when the average intensity of exposure is less than the intensity (referred to herein as the transition intensity) at the nadir of a plot of log continuous exposure versus log intensity (referred to in the art as a reciprocity curve) for a photographic element. The density difference observed is referred to in the art as an intermittency effect. It is known in the art that the effect of increasing the frequency of intermittent light exposures at an average intensity level below the transition intensity, holding the integrated sum of the exposures constant, causes the densities obtained to increase until a critical frequency is reached. Above the critical frequency no further increase in density occurs.

An unexpected increase in density difference between high density and low density areas of ultrasonographs formed by this process can be achieved by employing pulsed—that is, varied intensity, preferably intermittent, light exposures. This effect can be achieved employing nonimagewise or uniform light exposures of both high and low density rendering areas of the photographic elements in direct contrast with the necessarily differential (e.g., imagewise) light exposures of high and low density areas in obtaining photographic intermittency effects. Specifically, maximum obtainable densities can be increased significantly by nonimagewise or uniform, intermittent light exposures of photographic elements without the same increases in minimum densities occurring. In considering pulsed light exposure, such variants as synchronizing the pulsed light exposure with the ultrasound exposure and also varying the frequency of light pulsing are contemplated. Since the speed of light is much faster than the rate of pressure-rarefaction wave propagation, synchronized delay of light pulses is contemplated so that each light pule reaches the elements being exposed concurrently with or following after a time delay each ultrasound pulse. The duration of the delay of the light pulses with respect to the ultrasound pulses can be chosen to take optimum advantage of the chemical or physical alteration set in motion by the preceding ultrasound pulse or pulses.

As is well understood by those skilled in the art of photography, if silver halide emulsion imaging layers are given progressively greater exposures substantially in excess of those required to produce a maximum density, the densities produced typically plateau at the maximum density and then decline, in many instances, to approach the initial minimum density level (or less) at very high levels of exposure. This photographic effect is referred to in the art as solarization. Solarization is occasionally used in photography to reverse the sense of a photographic image. For example, solarization will produce a positive image using a normally negative-working photographic element.

Unlike conventional photography, the ultrasonographic images obtained with this process exhibit no reversal of the sense of the ultrasonographic image when operating at high levels of exposure approaching solarization. Accordingly, the maximum light exposures which are employed in the practice of this process can be at any level below that which will completely solarize the photographic element. For purposes of providing a point of reference "completely solarizing light exposure" is herein defined as that light exposure which produces a density after processing equal to the density produced in ultrasonically unexposed areas after processing in the absence of light exposure. It is contemplated to employ maximum light exposures which produce a density of at least 0.1 (preferably at least 0.5) above that produced by a completely solarizing light exposure.

If samples of a photographic element are processed according to this process, but not ultrasonically exposed, and each light exposed at a different light exposure level ranging up to some maximum exposure, such as a completely solarizing light exposure level, a characteristic curve can be plotted—that is, a curve can be formed by plotting observed density versus light exposure. If another set of samples are similarly processed, but with a fixed ultrasonic level of exposure, a second characteristic curve can be plotted. The density difference between the characteristic curves at a reference light exposure level is the difference between maximum and minimum densities obtained by the practice of this invention in the course of processing that photographic element under those process conditions. The maximum density difference can occur before the light exposure level is reached which produces a maximum density or at a higher light exposure level. For this reason it is in some instances unexpectedly advantageous to employ light exposure levels which are higher than those which produce a maximum density.

Once ultrasonic and light exposures of the photographic element have occurred, a selectively developable latent image has been formed in the exposed silver halide emulsion layer or layers of the element. The latent image can be subsequently converted to a visible image employing solutions and procedures which have conventionally employed in photographic processing. The term "photographic processing" is employed in its art recognized sense as designating those processing steps conventionally employed in photography to form a visible image corresponding to a latent image contained in a silver halide emulsion layer of a photographic element. Photographic processing useful in the practice of this process is disclosed, for example, in *Product Licensing Index*, Vol. 92, December 1971, publication 9232, paragraph XXIII, Processing, page 110, and *Research Disclosure*, Vol. 176, December 1978, publication 17643, paragraph XIX, Processing, page 28, both here incorporated by reference. *Research Disclosure* and *Product Licensing Index* are published by Industrial Opportunities Ltd., Homewell, Havant, Hampshire, PO9, 1EF, United Kingdom.

The photographic elements employed in the practice of this process typically include a support or substrate. The support can conveniently take the form of a conventional photographic support, such as disclosed in *Research Disclosure*, Paragraph XVII, Supports, Item 17643, cited above, here incorporated by reference.

In a simple form, the photographic element can consist of the support as described above and, coated thereon, a single silver halide emulsion layer. The emulsion can be formed by dispersed silver halide grains and a conventional photographic emulsion vehicle, such as a hydrophilic colloid or other suitable vehicle. The silver halide grains in the emulsion layer can be of any conventional type which can form a latent image predominantly on the surface of the silver halide grains or predominantly on the interior of the silver halide grains. Conventional photographic silver halide emulsions useful in the practice of this process are disclosed in *Research Disclosure*, Paragraph I, Item 17643, cited above, here incorporated by reference.

To illustrate a simple mode of practicing this invention, surface latent image silver halide grains are employed capable of forming a photographic negative image when light exposed in a conventional imaging silver halide emulsion layer; however, the emulsion in which they are incorporated in the practice of this process is modified by halide ion adjustment so that it is substantially desensitized to light exposure. That is, the pAg of the emulsion is adjusted with halide ion addition so that the maximum density obtainable with the element without ultrasonic activation at 30 seconds of immersion in a polar solvent is less than 1.0, preferably less than 0.5.

As is well understood by those skilled in the art, pAg is the negative logarithm (hereinafter designated log) of the silver ion concentration expressed in normality units (which for monovalent ions corresponds to moles/liter). The relationship of the silver ion concentration, expressed as pAg and the concentration of bromide ion, for example, in a silver bromide emulsion can be illustrated by the following equation:

$$-\log K_{sp} = pBr + pAg$$

where pAg is the negative log silver ion concentration, expressed in normality units, pBr is the negative log bromide ion concentration, expressed in normality units, and Ksp is the solubility product constant. As is well appreciated in the art, Ksp values are a function of both temperature and the specific halide or mixture of halides chosen.

From the foregoing, it is apparent that to elevate the pAg of the emulsion to a substantially desensitizing level, a higher concentration of halide ions (e.g, a lower pBr), is required in the emulsion layer. The pAg of the emulsion is preferably increased by bringing the emulsion into contact with a source of halide ions, such as alkali halide solution, while the emulsion is in the form of a melt before coating. Alternatively, the pAg of the silver halide emulsion can be regulated as it is formed. pAg is a commonly employed photographic emulsion making measuring approach which provides an indirect measure of halide ion concentration. It is, of course, recognized that the presence of emulsion constituents other than halide ions can also affect silver ion concentrations. Accordingly, pAg measurements must be carefully related to the emulsions with which they are being employed. Optimum halide ion levels to desensitize an imaging silver halide emulsion layer can be established by coating otherwise comparable emulsion layers at differing halide ion adjusted pAg levels. It is, of course, within the skill of the art to measure desensitizing halide ion levels directly rather than indirectly through the measurement of pAg.

The above-described desensitized photographic elements are ultrasonographically negative-working in this process. It appears that ultrasonic exposure of the above-described, high pAg ultrasonographic elements has the effect of accelerating the release of halide ions from the surface of the silver halide grains in the presence of a polar solvent with the result of lowering the pAg in the immediate vicinity of the silver halide grain surfaces. These grains are then no longer desensitized and will respond when subsequently exposed to light and further processed.

It is further recognized that ultrasonic exposure can concurrently stimulate ionic diffusion both into and out of the silver halide emulsion layer being exposed. For example, an ultrasonographically negative-working element useful in the practice of this process can be initially desensitized to light by imbibing bromide ions into the silver halide emulsion layer, as described above, and imagewise ultrasonically exposing the emulsion layer while it is in contact with a polar solvent containing silver ions dissolved therein. In this instance both bromide ion diffusion out of the emulsion layer and silver ion diffusion into the emulsion layer contribute to imagewise sensitizing the silver halide grains of the emulsion layer to light exposure. In a converse mode of practicing this process, the photographic element can be ultrasonographically positive-working, initially containing the silver ions imbibed in the emulsion layer while the bromide ions are dissolved in the polar solvent in contact therewith. In this instance, it is silver ion diffusion out of the emulsion layer and bromide ion diffusion into the emulsion layer that relatively desensitizes the silver halide grains to light exposure.

The foregoing modes of practicing this process with silver halide photographic elements are described by reference to surface latent image-forming silver halide grains which are desensitized to light exposure as a function of pAg. Silver halide grains which contain an internal latent image are not developable in surface developers and therefore yield photographic responses in surface developers similar to surface latent image-forming silver halide grains which have been desensitized—that is, which contain no or few latent image centers. Conventional silver halide grains and emulsions can then be used in the foregoing modes of practicing this process which exhibit a balance of internal and surface latent image-forming efficiencies which can be shifted as a function of pAg adjustment. The references herein to silver halide grains and emulsions which have been desensitized include as a species thereof silver halide grains and emulsions which under the pAg conditions of light exposure form internal latent images, but which can form surface latent images at a different pAg.

To illustrate specifically useful embodiments of this type, what are known in the art as converted-halide type silver halide grains exhibit a balance of internal and external latent image-forming capabilities. In the form employed by Davey and Knott U.S. Pat. No. 2,592,250 and Motter U.S. Pat. No. 3,703,584, the internal and external latent image-forming efficiencies of the converted-halide type silver halide grains are weighted in favor of forming an internal latent image. However, in Evans U.S. Pat. No. 3,622,318, issued Nov. 23, 1971, the converted-halide type silver halide grains are surface chemically sensitized to a degree to balance the internal and external latent image-forming efficiencies in favor of the formation of a surface latent image. In Motter, cited above, surface latent images can be similarly formed if surface chemical sensitization is undertaken to the same degree. Evans U.S. Pat. No. 3,761,276, cited above, is an illustration of internally doped and surface chemically sensitized silver halide grains exhibiting a balance of internal and surface latent image efficiencies, which under the contemplated conditions of photographic use disclosed therein, are predisposed to form an internal latent image. Evans and Atwell U.S. Pat. No. 4,035,185, cited above, illustrates a blended emulsion of the type disclosed by Evans ('276) wherein the silver halide grains are internally doped with a combination of a noble metal and a middle chalcogen sensitizer.

The photographic elements of Davey and Knott, Motter, Evans ('276) and Evans and Atwell are useful as ultrasonographically negative-working elements in the practice of this process, since they are initially incapable of forming a surface latent image when exposed to light, but can be made capable of forming a surface latent image by lowering the pAg at the silver halide grain surface. The photographic elements of Evans ('318) can be employed in this process as ultrasonographically positive-working elements, since they are initially capable of forming a surface latent image upon exposure to light, but can be converted to a form in which an internal latent image is formed by increasing the pAg adjacent the surface of the silver halide grains. It is recognized that the pAg of the photographic elements of these patents can be altered uniformly before ultrasonic exposure so that the negative-working elements are converted to positive-working elements and vice versa.

The term "surface developer" is used in its art recognized sense and encompasses those developers which will reveal the surface latent image on a silver halide grain, but will not reveal substantial internal latent image in an internal image-forming emulsion, under conditions generally used to develop a surface-sensitive silver halide emulsion. The surface developers can generally utilize any of the silver halide developing agents or reducing agents, but the developing bath or composition is generally substantially free of a silver halide solvent (such as water-soluble thiocyanates, water-soluble thioethers, thiosulfates, ammonia and the like) which will disrupt or dissolve the grain to reveal substantial internal image. Low amounts of excess halide are sometimes desirable in the developer or incorporated in the emulsion as halide-releasing compounds, but high amounts are generally avoided to prevent substantial disruption of the grain, especially with respect to iodide-releasing compounds.

In photographic processes for producing direct-positive images employing conventional silver halide emulsions exhibiting a balance of internal and surface latent image-forming efficiencies, the use of fogging or nucleating agents in the element or developer is common. These fogging or nucleating agents can be employed in the practice of this process, but they are not required, since the nonimagewise or uniform light exposure step of this process simultaneously performs functions similar to both the imagewise light exposure step and the fogging or nucleating step of direct-positive photographic imaging. It is recognized, of course, that light exposure can be confined selectively to only those areas of the ultrasonographic element which are intended to form an internal latent image and, instead of light exposing areas to form a surface latent image, the direct-positive photographic nucleating procedure can be relied upon.

The patents of Davey and Knott, Motter, Evans ('276) and Evans ('318), cited above, are specifically incorporated by reference to illustrate further details of silver halide grains and emulsions exhibiting balanced internal and surface latent image-forming efficiencies as well as the techniques for their processing and to define and illustrate the terms of art, such as "converted-halide", "surface developer", "internal latent image" and the like, which are well known and understood by those skilled in the art of photography.

Although light exposure of the silver halide emulsion layer can be confined to the portion of the spectrum to which the imaging grains possess a native sensitivity, it is contemplated to sensitize spectrally the silver halide grains so that they respond also to other portions of the electromagnetic spectrum. Spectral sensitization can be undertaken using the dyes and techniques which are conventional in preparing spectrally sensitive photographic elements.

Sensitizing dyes useful in sensitizing silver halide emulsions are described for example, in Brooker et al U.S. Pat. No. 2,526,632, Sprague U.S. Pat. No.

2,503,776, Brooker et al U.S. Pat. No. 2,493,748 and Taber et al U.S. Pat. No. 3,384,486. Spectral sensitizers which can be used include the cyanines, merocyanines, complex (tri-or tetranuclear) cyanines, holopolar cyanines, styryls, hemicyanines (e.g., enamine hemicyanines), oxonols and hemioxonols.

Dyes of the cyanine classes suitable for sensitizing silver halide can contain such basic nuclei as the thiazolines, oxazolines, pyrrolines, pyridines, oxazoles, thiazoles, selenazoles and imidazoles. Such nuclei can contain alkali, alkylene, hydroxyalkyl, sulfoalkyl, carboxyalkyl, aminoalkyl and enamine groups and can be fused to carboxylic or heterocyclic ring systems either unsubstituted or substituted with halogen, phenyl, alkyl, haloalkyl, cyano, or alkoxy groups. The dyes can be symmetrical or unsymmetrical and can contain alkyl, phenyl, enamine or heterocyclic substituents on the methine or polymethine chain.

The merocyanine dyes can contain the basic nuclei mentioned above as well as acid nuclei such as thiohydantoins, rhodanines, oxazolidenediones, thiazolidenediones, barbituric acids, thiazolineones, and malononitrile. These acid nuclei can be appropriately substituted with alkyl, alkylene, phenyl, carboxyalkyl, sulfoalkyl, hydroxyalkyl, alkoxyalkyl, alkylamino groups, or heterocyclic nuclei. Combinations of these dyes can be used, if desired. In addition, super-sensitizing addenda which do not absorb visible light can be included, for instance, ascorbic acid derivatives, azaindenes, cadmium salts, and organic sulfonic acids as described in McFall et al U.S. Pat. No. 2,933,390 and Jones et al U.S. Pat. No. 2,937,089.

It is known in the art that spectral sensitizing dyes in addition to extending the spectral response of the silver halide grains can have a definite desensitizing effect on the grains. The degree of desensitization exhibited is a function of parameters such as the concentration of the dye incorporated, the oxidation and reduction potentials of the dye and the pAg of the silver halide emulsion layer into which it is incorporated. By employing sensitizing dyes as desensitizers, it is possible to reduce the background or minimum densities of negative-working ultrasonographic elements, since the desensitizing action of the dye supplements the desensitization effect attributable solely to the high initial pAg of the emulsion layer. By employing desensitizers which become less effective at lower pAg's, it is possible to avoid desensitization in ultrasonically exposed areas of the ultrasonographic element. Large differences in density can be obtained between ultrasonically exposed and unexposed areas of ultrasonographically negative-working elements using selected desensitizers.

It is contemplated to employ in the practice of this process any conventional silver halide emulsion desensitizer. It is preferred to employ desensitizers which exhibit a variation in desensitization as a function of pAg and, in ultrasonographically negative-working elements, it is preferred to employ desensitizers which become less effective at lowered pAg values.

Specifically preferred desensitizers are dyes, such as cyanine and merocyanine dyes, and compounds which are dyes which exhibit a strong desensitizing effect on photographically negative-working silver halide emulsions disclosed in *Research Disclosure,* Paragraph IV, Item 17643, cited above, here incorporated by reference.

While simple photographic elements are described, it is apparent that this process is generally useful with any conventional photographic element, the imaging silver halide emulsion layer or layers of which have been desensitized through the use of a high pAg, preferably halide ion adjusted high pAg. Stated still more generally, it is apparent that any conventional photographic element which exhibits a speed dependence on the pAg of the silver halide imaging layer or layers can be employed in the practice of this process. The halide ions employed for adjusting the pAg can correspond to the halides forming the silver halide grains. It is preferred to employ soluble bromide salts, such as alkali metal bromides, to raise pAg. It is preferred to employ water soluble silver salts for lowering pAg, such as silver nitrate.

While the above modes of practicing this process employ a photographic element which exhibits an alteration in sensitivity as a function of halide ion adjusted pAg, it is appreciated that this process can be practiced using still other mechanisms of sensitization or desensitization. For example, in the practice of this process any conventional photographic element having at least one silver halide emulsion layer can be employed which contains a protonated dye which can be deprotonated to a light-absorbing, spectral sensitizing form.

Where the spectral sensitizing dye is of a type which can be converted from an initially colorless form to a light-absorbing form by deprotonation, it is apparent that the above-described process can be readily adapted to forming negative ultrasonographic images. In this instance, the dye in its protonated form is incorporated in the imaging silver halide emulsion layer. The polar solvent to be contacted with the element is then chosen so that it is of a higher pH than the emulsion layer so that the element when immersed in the polar solvent experiences a deprotonation of the dye to its chromophoric form in from 10 seconds to 10 hours. By practicing the process as described above, it produces an ultrasonographic negative image, and the element, since it goes from an initially light-insensitive form to a light-sensitive form, is ultrasonographically negative-working, as that term has been defined above.

Exemplary of conventional spectral sensitizing dyes which are known to be protonatable to a colorless form and/or deprotonated to generate the dye chromophore are those disclosed by A. H. Herz, *Photographic Science and Engineering,* Vol. 18, No. 2, March–April 1974, pages 207 through 215 and VanLare U.S. Pat. No. 3,482,981. Preferred spectral sensitizing dyes of this type are benzimidazole carbocyanine dyes. By proper choice of nuclei substituents such dyes can be made to exhibit absorption maxima at wavelengths within the blue, green, red and infrared portions of the electromagnetic spectrum.

In addition to spectral sensitizing dyes whose effectiveness can be modified by pH, desensitizers having pH dependence are also known in the art. For example, Itoh, *J. Soc. Sci. Photo.,* Vol. 32, page 18, 1969, discloses that adenine, a known desensitizer, will adsorb to silver halide grains at a pH of 6, but not at a pH of 2. Similarly, E. J. Birr, *Z. Wiss. Phot.,* Vol. 49, page 261, 1954, Volume 50, page 107, 1955 and Volume 50, page 124, 1955, discloses the pH dependence of adsorption of tetraazindenes. E. J. Birr in his book *Stabilization of Photographic Silver Halide Emulsions,* Focal Press, 1974, page 175, discloses that the desensitizers nitrobenzimidazole, mercaptobenzimidazole, mercaptobenzimidzole sulfonic acid, benzotriazole and phenylmercaptotetrazole are selectively adsorbed by silver halide grains at higher pH.

It is apparent that the ultrasonographic elements discussed immediately above illustrate that ultrasonic radiation can be employed to modify locally the pH of an imaging silver halide emulsion layer so that its light response is also locally modified. This ultrasonically induced modification of the element can be used to generate a viewable ultrasonographic image. Since the component of the emulsion layer in this instance being acted upon is the sensitizer or desensitizer, it is apparent that any conventional photographic element comprised of at least one imaging silver halide emulsion layer compatible with such a pH modifiable sensitizer or desensitizer can be employed.

The photographic elements described above as being pAg or pH modifiable in their photographic response through the use of ultrasonographic radiation can, of course, contain a variety of conventional photographic silver halide emulsion addenda. The silver halide photographic elements can be chosen from among those particularly adapted for various photographic applications, such as thermal processing, image transfer, multicolor imaging and the like. For example, any of the conventional photographic features disclosed in *Research Disclosure*, Item 17643, and *Product Licensing Index*, Item 9232, both cited above, not incompatible with obtaining the desired pAg and pH modification effects, can be used in the practice of this process.

Plural Layer Recording Layer Units

Although the ultrasonographic elements are described above in terms of a recording layer unit consisting of a single layer coated on a support, significant advantages can be obtained in terms of maximum densities and image discrimination by expanding the recording layer unit to include also a transport liquid permeable layer in contact with the recording layer and between the recording layer and the support. The transport liquid permeable layer can be formed, for example, of any of the conventional vehicle and vehicle extenders employed in silver halide emulsion layers. These layers, more specifically undercoats, are preferably formed of a hydrophilic colloid, such as gelatin or a gelatin-derivative, as described above. Undercoat layers of this type are conventional in silver halide photographic elements.

It is also recognized that further improvements in maximum densities and image discrimination can be achieved when a plurality of recording layers are present as opposed to a single recording layer. In such an arrangement it is preferred that each recording layer be under coated with a transport liquid permeable layer in contact with the recording and interposed between the recording layer and the support. Conventional silver halide photographic elements with vehicle interlayers between adjacent emulsion layers illustrate useful ultrasonographic elements of this type. Copending, commonly assigned patent application Ser. No. 31,083, filed Apr. 18, 1979, titled AN IMPROVEMENT IN ULTRASONOGRAPHY, now U.S. Pat. No. 4,223,082 which in part corresponds to Belgian Patent No. 864,089, cited above, discloses suitable ultrasonographic elements of this type and is here incorporated by reference.

Still another form of multiple layer recording layer unit useful in the practice of this invention is disclosed in copending, commonly assigned patent application Ser. No. 30,665, filed Apr. 16, 1979, titled ULTRASONOGRAPHIC ELEMENTS CONTAINING MULTIPLE LAYERS AND PROCESS FOR THEIR USE, now U.S. Pat. No. 4,269,914 cited above, and here incorporated by reference.

In one specifically preferred form an outer layer of the recording layer unit is a silver halide emulsion layer which contains diffusible ions capable of desensitizing the emulsion to light. A layer nearer the support is a receiving layer for the diffusible ions, and a barrier layer separates the emulsion and receiving layers.

When the element is immersed in transport liquid and imagewise ultrasonically exposed, the diffusible ions which are initially desensitizing the silver halide emulsion layer in part diffuse into the transport liquid. A portion of the diffusible ions also enter the barrier layer, since their rate of diffusion in the barrier material is greatly accelerated by ultrasound. However, since the diffusion paths of the ions are essentially random, in the absence of the receiving layer, the diffusible ions are free, not only to enter the barrier layer, but also to return.

The presence of the receiving layer can have the effect of increasing both the image discrimination and the ultrasonic sensitivity of the ultrasonographic element. The diffusible desensitizing ions leaving the emulsion layer penetrate the barrier layer and thereby come into contact with the receiving layer. Upon contact with the receiving layer the ions are immobilized. Thus, they are not free to continue their random migration in the presence of ultrasound, which otherwise results in a portion of the ions migrating back to the emulsion layer. It is believed that the enhanced response of the ultrasonographic elements of this invention in this preferred form can be attributed to the contribution of the receiving layer in depleting the desensitizing ions initially within the emulsion layer.

It is specifically contemplated that both the layer which is the source of diffusible ions (i.e., the source layer) and the receiving layer can be silver halide emulsion layers. The two emulsions are preferably chosen so that the ultrasonically induced migration of a diffusible ion from one emulsion layer has the effect of sensitizing it as well. In this specific form the receiving layer is preferably a silver chloride emulsion layer while the source layer is a silver bromide emulsion layer which is desensitized by bromide ion adjustment as has been described above. Where the receiving layer is not a silver halide emulsion layer, it can take the form of a layer containing any convenient substance for immobilizing the ions diffusing from the source layer. For example, the receiving layer can contain a silver salt, such as silver nitrate, to react with and immobilize bromide ions migrating from a bromide ion desensitized silver halide emulsion source layer.

To the extent that any of the layers of the ultrasonographic elements may be softened or swollen by association with transport liquid and/or heating, softening or swelling can be controlled by incorporating conventional photographic hardeners in the various layers. The layers of the ultrasonographic elements containing crosslinkable polymeric materials, such as hydrophilic colloids, particularly the gelatin-containing layers, can be hardened by various organic and inorganic hardeners, such as those described in T. H. James, *The Theory of the Photographic Process*, 4th Ed., MacMillan, 1977, pp. 77–87. The hardeners can be used alone or in combination and in free or in blocked form in any suitable conventional concentration level.

Typical useful hardeners include formaldehyde and free dialdehydes, such as succinaldehyde and glutaraldehyde, as illustrated by Allen et al U.S. Pat. No. 3,232,764; blocked dialdehydes, as illustrated by Kaszuba U.S. Pat. No. 2,586,168, Jeffreys U.S. Pat. No. 2,870,013, and Yamamoto et al U.S. Pat. No. 3,819,608; α-diketones, as illustrated by Allen et al U.S. Pat. No. 2,725,305; active esters of the type described by Burness et al U.S. Pat. No. 3,542,558; sulfonate esters, as illustrated by Allen et al U.S. Pat. Nos. 2,725,305 and 2,726,162; active halogen compounds, as illustrated by Burness U.S. Pat. No. 3,106,468, Silverman et al U.S. Pat. No. 3,839,042, Ballantine et al U.S. Pat. No. 3,951,940 and Himmelmann et al U.S. Pat. No. 3,174,861; s-triazines and diazines, as illustrated by Yamamoto et al U.S. Pat. No. 3,325,287, Anderau et al U.S. Pat. No. 3,288,775 and Stauner et al U.S. Pat. No. 3,992,366; epoxides, as illustrated by Allen et al U.S. Pat. No. 3,047,394, Burness U.S. Pat. No. 3,189,459 and Birr et al German Patent No. 1,085,663; aziridines, as illustrated by Allen et al U.S. Pat. No. 2,950,197, Burness et al U.S. Pat. No. 3,271,175 and Sato et al U.S. Pat. No. 3,575,705; active olefins having two or more active bonds, as illustrated by Burness et al U.S. Pat. Nos. 3,490,911, 3,539,644 and 3,841,872 (Reissue 29,305), Cohen U.S. Pat. No. 3,640,720, Kleist et al German Patent No. 872,153 and Allen U.S. Pat. No. 2,992,109; blocked active olefins, as illustrated by Burness et al U.S. Pat. No. 3,360,372 and Wilson U.S. Pat. No. 3,345,177; carbodiimides, as illustrated by Blout et al German Patent No. 1,148,446; isoxazolium salts unsubstituted in the 3-position, as illustrated by Burness et al U.S. Pat. No. 3,321,313; esters of 2-alkoxy-N-carboxydihydroquinoline, as illustrated by Bergthaller et al U.S. Pat. No. 4,013,468; N-carbamoyl and N-carbamoyloxypyridinium salts, as illustrated by Himmelmann U.S. Pat. No. 3,880,665; hardeners of mixed function, such as halogen-substituted aldehyde acids (e.g., mucochloric and mucobromic acids), as illustrated by White U.S. Pat. No. 2,080,019, 'onium substituted acroleins, as illustrated by Tschopp et al U.S. Pat. No. 3,792,021, and vinyl sulfones containing other hardening functional groups, as illustrated by Sera et al U.S. Pat. No. 4,028,320; and polymeric hardeners, such as dialdehyde starches, as illustrated by Jeffreys et al U.S. Pat. No. 3,057,723, and copoly(acrolein-methacrylic acid), as illustrated by Himmelmann et al U.S. Pat. No. 3,396,029.

The use of hardeners in combination is illustrated by Sieg et al U.S. Pat. No. 3,497,358, Dallon et al U.S. Pat. No. 3,832,181 and 3,840,370 and Yamamoto et al U.S. Pat. No. 3,898,089. Hardening accelerators can be used, as illustrated by Sheppard et al U.S. Pat. No. 2,165,421, Kleist German Patent No. 881,444, Riebel et al U.S. Pat. No. 3,628,961 and Ugi et al U.S. Pat. No. 3,901,708.

The foregoing discussion is considered sufficiently complete to permit those familiar with the photographic and ultrasonic arts to practice this process. To the extent that specific details and variants of this process and means for its practice are not explicitly discussed they can be appreciated by reference to the photographic and ultrasonic arts. For example, it is contemplated that the ultrasonic exposure, development and other processing steps of this process can be practiced within the temperature ranges conventionally employed in photography.

The invention is further illustrated by the following examples:

EXAMPLES 1 AND 2

To illustrate a specific preferred embodiment of the present invention an ultrasonographic element was prepared in the following manner: A hardened gelatinosilver bromide emulsion free of surface chemical sensitization and having a mean grain diameter of 0.2 micron, to which a desensitizing dye, 1,1'-diethyl-6,6'-dinitrothiacyanine chloride, has been added at a level of $1.25 \times 10^{-4}$ mole per mole of silver, was coated on a poly(ethylene terephthalate) film support to obtain a silver coverage of 3.2 grams per square meter and a gelatin coverage of 2.7 grams per square meter. The pH of the emulsion coating was 6.5 and the pAg 6.0.

During each ultrasound exposure the ultrasonographic element was pressed between two aligned open-ended cylinders so that it formed a dividing wall separating the interiors of the cylinders. The cylinders were vertically aligned above an ultrasound transducer in a reservoir containing a distilled water transport liquid so that the emulsion layer of the ultrasonographic element was on the surface of the support nearest the transducer. The lower cylinder was filled with distilled water by immersing it in the transport liquid within the reservoir. The upper cylinder was filled with distilled water at varied temperatures shown below in Table I.

The emulsion layer was positioned horizontally during ultrasonic exposure 7.6 cm above the tip of the ultrasound transducer. The ultrasound transducer was driven to provide ultrasound at a peak intensity of 0.57 watt per square centimeter at the emulsion layer. A pulsed ultrasound exposure was employed at $10^{-6}$ second pulse width, $10^{-4}$ second pulse period and 10 seconds total elapsed exposure time. Prior to ultrasound exposure the emulsion layer was in contact with the transport liquid for 10 seconds, and following ultrasound exposure the emulsion layer was in contact with the transport liquid for 40 seconds prior to light exposure.

The light source was an array of 132 tungsten lamps of one and one-half watt each (commercially available under the trademark GE 31) equally spaced on a polished metal reflecting surface contained within a housing 10 by 40 centimeter on an edge. Light exposure of the element for 8 seconds at 65,000 lux (lumens per square meter). Following light exposure the ultrasonographic element was removed from contact with the transport liquid and developed in Kodak Developer D-19, fixed, washed and dried. Except for the difference in the thermal gradient each of the elements were identically exposed and processed.

TABLE I

| | Reservoir Temperature (°C.) | Upper Cylinder Temperature (°C.) | Density | | Image Discrimination |
|---|---|---|---|---|---|
| | | | Exposed Areas | Background | |
| Control | 20 | 20 | 2.6 | 1.2 | 1.4 |
| Example 1 | 20 | 35 | 3.7 | 1.1 | 2.6 |
| Example 2 | 20 | 45 | 5.6 | 1.6 | 4.0 |

In reviewing the results reported in Table I it can be seen that in the absence of a temperature differential in the transport liquid immediately adjacent the recording layer unit (the emulsion layer) a density of 2.6 was obtained in exposed areas while a density of 1.2 was obtained in background (ultrasonically unexposed) areas. This demonstrated that the ultrasound in the absence of the thermal gradient was able to accelerate equilibration of the ultrasonographic element and the transport liquid. The image discrimination was 1.4.

When the temperature of the distilled water in the upper cylinder contacting the ultrasonographic element support surface opposite the recording layer unit was raised to 35° C. as in Example 1, the density obtained in ultrasonically exposed areas increased significantly to 3.7. On the other hand, the background density remained at approximately the same level as in the absence of a thermal differential. This resulted in an increase in the image discrimination from 1.4 to 2.6. The effect of being able to increase the density in ultrasonically exposed areas without significantly raising density in background areas is distinctly advantageous for ultrasonographic imaging.

In Example 2 the temperature of the liquid in the upper cylinder was raised further from 35° C. to 45° C. The result was a further increase in density in exposed areas. A density increase in exposed areas of 3.0 was observed to result from the thermal gradient employed. Background density rose slightly to 1.6, a rise of only 0.4. Image discrimination was 4.0 as compared to only 1.4 in the absence of a thermal gradient. The imaging results continued to improve as the thermal gradient was increased from 15° to 25° C. between the support surface of the ultrasonographic element and the transport liquid reservoir.

The results of Examples 1 and 2 were qualitatively corroborated by additional investigations. Although densities in exposed areas were in some instances less than those of Examples 1 and 2, these examples are considered fairly indicative of results which can be obtained by the practice of this process.

EXAMPLES 3 AND 4

The procedure of Examples 1 and 2 was repeated, but with these changes: The photographic elements were hardened with 2 percent by weight bis(vinylsulfonylmethyl)ether, based on the total weight of gelatin, and the pH of the emulsion was adjusted to 5.5. Prior to exposure the emulsion layer was in contact with the transport liquid for 5 seconds, and following ultrasound exposure the emulsion layer was in contact with the transport liquid for 10 seconds prior to light exposure. In each instance the photographic element received an ultrasound exposure of 0.2 watt-sec/cm$^2$ at the emulsion layer surface. Except for the difference in the thermal gradient each of the elements were identically exposed and processed. The results are summarized in Table II.

TABLE II

| | Reservoir Temperature (°C.) | Upper Cylinder Temperature (°C.) | Density | | Image Discrimination |
|---|---|---|---|---|---|
| | | | Exposed Areas | Background | |
| Control | 20 | 20 | 1.2 | .1 | 1.1 |
| Control | 20 | 20 | 1.0 | .1 | 0.9 |
| Example 3 | 20 | 77 | 3.1 | .2 | 2.9 |
| Example 4 | 20 | 80 | 3.3 | .2 | 3.1 |

The emulsion layers of the elements employed in Examples 3 and 4 showed no visible evidence of softening or swelling as compared to the Control elements, thus illustrating that higher temperatures can be employed in the practice of this invention.

The invention has been described in detail with particular reference to preferred embodiments thereof but it will be understood that variations and modifications can be effected within the spirit and scope of the invention.

What is claimed is:

1. In a process of recording an ultrasonic exposure pattern employing an ultrasonographic element comprised of a support and a recording layer unit capable of producing an ultrasonographic record as a function of diffusion to a transport liquid, the recording layer unit being beneath the support and in contact with the transport liquid, said process comprising imagewise ultrasonically exposing below 100 watt-sec/cm$^2$ the recording layer unit through the transport liquid to accelerate diffusion from the recording layer unit into the transport liquid in exposed areas, thereby producing in the recording layer unit an ultrasonographic record, the improvement comprising further accelerating diffusion in ultrasonically exposed areas by establishing a temperature differential within the transport liquid adjacent the recording layer unit so that the transport liquid remote from the recording layer unit is at a relatively lower temperature than the transport liquid contacting the recording layer unit.

2. An improved process according to claim 1 additionally including the step of converting the ultrasonographic record to a viewable ultrasonographic image.

3. An improved process according to claim 2 in which the recording layer unit is ultrasonographically negative-working and a maximum density is produced in the ultrasonographic image corresponding to ultrasonically exposed areas of the recording layer unit.

4. An improved process according to claim 1 in which the ultrasonographic element and the transport liquid are maintained within a temperature range of from about 5° to 80° C.

5. An improved process according to claim 4 in which the ultrasonographic element and the transport liquid are maintained within a temperature range of from about 10° to 60° C.

6. An improved process according to claim 1 in which the support and the transport liquid remote from the recording layer unit exhibit a temperature differential in the range of from about 1° to 75° C.

7. An improved process according to claim 6 in which the support and the transport liquid remote from the recording layer unit exhibit a temperature differential in the range of from about 5° to 50° C.

8. An improved process according to claim 1 in which the transport liquid exhibits a viscosity in the range of from about 0.5 to 1.5 centipoise.

9. An improved process according to claim 1 in which the ultrasonographic element is substantially horizontally positioned during ultrasonic exposure.

10. In a process of recording an ultrasonic exposure pattern employing an ultrasonographic element comprised of a support and a silver halide emulsion containing recording layer unit capable of producing an ultrasonographic record as a function of diffusion to a transport liquid, the recording layer unit being beneath the support and in contact with the transport liquid, said process comprising imagewise ultrasonically exposing the recording layer unit through the transport liquid to accelerate diffusion from the recording layer unit into the transport liquid in exposed areas, thereby producing in the recording layer unit an ultrasonographic record, the improvement comprising further accelerating diffusion in ultrasonically exposed areas by establishing a temperature differential within the transport liquid adjacent the recording layer unit so that the transport liquid remote from the recording layer unit is at a relatively lower temperature than the transport liquid contacting the recording layer unit.

11. An improved process according to claim 10 additionally including the step of converting the ultrasonographic record to a viewable ultrasonographic image.

12. An improved process according to claim 11 in which the recording layer unit is ultrasonographically negative-working and a maximum density is produced in the ultrasonographic image corresponding to ultrasonically exposed areas of the recording layer unit.

13. An improved process according to claim 10 in which the ultrasonographic element and the transport liquid are maintained within a temperature range of from about 5° to 80° C.

14. An improved process according to claim 13 in which the ultrasonographic element and the transport liquid are maintained within a temperature range of from about 10° to 60° C.

15. An improved process according to claim 10 in which the support and the transport liquid remote from the recording layer unit exhibit a temperature differential in the range of from about 1° to 75° C.

16. An improved process according to claim 15 in which the support and the transport liquid remote from the recording layer unit exhibit a temperature differential in the range of from about 5° to 50° C.

17. An improved process according to claim 10 in which the transport liquid exhibits a viscosity in the range of from about 0.5 to 1.5 centipoise.

18. An improved process according to claim 10 in which the ultrasonographic element is substantially horizontally positioned during ultrasonic exposure.

19. An improved process according to claim 10 in the silver halide emulsion contains sufficient hardener to permit use of the recording layer unit at temperatures up to 80° C.

* * * * *